United States Patent [19]
Goldsmith

[11] Patent Number: 5,009,781
[45] Date of Patent: Apr. 23, 1991

[54] CROSS-FLOW FILTRATION DEVICE WITH FILTRATE NETWORK AND METHOD OF FORMING SAME

[75] Inventor: Robert L. Goldsmith, Belmont, Mass.

[73] Assignee: CeraMem Corporation, Waltham, Mass.

[21] Appl. No.: 254,280

[22] Filed: Oct. 5, 1988

Related U.S. Application Data

[63] Continuation-in-part of Ser. No. 33,572, Apr. 2, 1987, Pat. No. 4,781,831.

[51] Int. Cl.⁵ .............................................. B01D 61/08
[52] U.S. Cl. .................. 210/247; 210/321.89; 210/496
[58] Field of Search ............... 210/247, 34.82, 321.89, 210/486, 652, 496

[56] References Cited
U.S. PATENT DOCUMENTS 3,712,473  1/1973  Ellenburg .................. 210/496 X
4,222,874  9/1980  Connelly .................. 210/652 X
4,568,456  2/1986  van Zon .................. 210/321.89
4,781,831  11/1988  Goldsmith .................. 210/486 X Primary Examiner—Frank Spear
Attorney, Agent, or Firm—Wolf, Greenfield & Sacks

[57] ABSTRACT

A cross-flow filtration device which receives a feed stock at a feed end face and separates the feed stock into filtrate and retentate, the device having a monolith with at least one filtrate network. The monolith is formed of porous material and defines a number of passageways which extend longitudinally from the feed end face to a retentate end face of the monolith. The filtrate network includes a number of longitudinal filtrate chambers and one or more filtrate channels which transect the chambers. The filtrate channel communicates with at least one filtrate duct that discharges filtrate from one or both end faces of the monolith. The filtrate chambers are distributed among the passageways to provide low pressure drop flow paths for filtrate flow through the porous material from the passageways to nearby filtrate chambers.

24 Claims, 2 Drawing Sheets

CROSS-FLOW FILTRATION DEVICE WITH FILTRATE NETWORK AND METHOD OF FORMING SAME

RELATED CASES

This application is a continuation-in-part of U.S. Ser. No. 033,572, filed Apr. 2, 1987, "Improved Cross-Flow Filtration Device With Filtrate Flow Conduits And Method of Forming Same", by Robert L. Goldsmith, now U.S. Pat. No. 4,781,831.

FIELD OF INVENTION

This invention relates to an improved cross-flow filtration device for separating a feed stock into filtrate and retentate, and more particularly to such a device having one or more filtrate networks with low flow resistance which provide enhanced filtrate removal from the interior of the device. This invention also relates to an improved membrane device which employs such a cross-flow filtration device as a membrane support.

BACKGROUND OF INVENTION

There are a multitude of filtration devices which separate a feed stock into filtrate and retained suspended matter which is too large to pass through the pore structure of the filter. A straight-through filter retains the suspended matter on the filter surface or within the filter matrix and passes only the filtrate. Cross-flow filters operate with tangential flow across the filter surface to sweep away suspended matter unable to pass through the filter surface pores. Cross-flow filters provide for the continuous extraction of retentate, or concentrated suspended matter, from one portion of the device and continuous extraction of filtrate from another portion. As is well known in the art, the filtration rate of cross-flow filters is generally limited by the resistance of a filter cake that builds up on the filter surface. The thickness and corresponding resistance of this cake is controlled by the cross-flow velocity. This phenomenon of cake thickness controlled by concentration polarization of retained suspended matter is extensively described in the technical literature. In order to obtain the maximum filtration rate, cross-flow filters are normally constructed from porous materials which have a low resistance to filtrate flow relative to that of the filter cake. That is, in operation the pressure drop across the porous filter itself is low relative to the pressure drop across the filter cake, and the resistance of the latter is determined by hydrodynamic flow conditions across the filter surface.

Cross-flow filters can be constructed using multiple-passageway, porous monoliths. Such monoliths can have tens to thousands of passageways extending through them, with the passageways normally parallel and uniformly spaced. When in use the feed stock is introduced under pressure at one end of the monolith, flows in parallel through the passageways, and is withdrawn as retentate at the downstream end of the device. Filtrate which passes into the porous monolith walls separating the passageways combines and flows through the walls toward the periphery of the monolith, and is removed through an integral, pressure-containing outer skin of the monolith. The resistance to flow in the tortuous flow path of the monolith passageway walls can severely limit filtration capacity, and for this reason cross-flow filters based on high surface area, multiple-passageway, porous monoliths are not found in commercial use.

Membrane devices utilize a semipermeable membrane to separate filtrate, also called permeate, from retentate. There is a multitude of different membrane devices which separate and concentrate particles, colloids, macromolecules, and low molecular weight molecules. Membranes generally require a mechanical support which can be integral with the membrane, as for self-supporting asymmetric membranes, or separate. For the latter, membranes can be coated onto, or simply mechanically supported by, a porous support material.

Multiple-passageway, porous monoliths can be especially useful as membrane supports. In this instance membranes are applied to the passageway walls, which serve both as a mechanical support and as the flow path for filtrate removal to a filtrate collection zone. A high flow resistance of the passageway walls of the monolith can be troublesome first in that it can prevent adequate formation of membranes, for example, by dynamic formation procedures. Second, if membranes are otherwise applied to the monolith passageway walls, the resistance of the passageway walls to filtrate flow can limit device capacity. This limitation has clearly been recognized by developers of such devices, for example, by Hoover and Roberts in U.S. Pat. No. 4,069,157. That patent teaches a solution to such limitation by limiting a number of parameters to values within specific ranges. The surface area of the passageways per unit volume, the porosity of the support, and the proportion of the volume of the support material exclusive of the passageways to the total volume of the support are defined within certain ranges, and are combined to define an allowable range of a permeability factor for the support.

Other monolith-based membrane devices have been developed in the United States, France, and The People's Republic of China. For these devices practitioners also have recognized a support permeability limitation and have generally overcome this limitation by use of monoliths with combinations of small overall diameter, relatively few feed passageways and large pore size of the support material. Several commercially-available membrane devices utilize a number of small diameter monoliths, each with up to 19 passageways, distributed within a cylindrical housing. Filtrate exits from the sides of each monolith and mixes with the filtrate from the other monoliths, after which it is collected. The overall packing density, or membrane area per unit volume, of these devices is quite low.

The monoliths used by all the above sources as supports for membrane devices have had the common characteristic of employing passageways which are substantially uniformly spaced throughout the support. Given this constraint, product developers have worked with variables such as those detailed by Hoover and Roberts in the above referenced patent to avoid filtrate flow path limitations.

Thus the flow resistance of the passageway walls of porous monoliths can be a limiting factor in the use of monoliths either as cross-flow filtration devices or as membrane supports in membrane devices. Further, this limitation becomes increasingly severe as the packing density, or effective filter or membrane area per unit volume, of the device increases.

Other developers of monolith based devices have used means of filtrate removal other than along the sides of the monolith device. One category of such filtration devices is a balanced pressure system. In this device one or more of the passageways is used to remove filtrate in a longitudinal manner rather than in the radial manner of Hoover and Roberts cited above. Such devices include those of Ellenburg in U.S. Pat. No. 3,712,473, Hoover and Roberts in U.S. Pat. No. 4,032,454, and Connelly in U.S. Pat. No. 4,222,874. For these devices the primary reason for selecting this mode of filtrate removal is to be able to pressurize the monolith exterior surface with feed material in order to keep the monolith under a compressive force, thereby minimizing the potential of monolith mechanical failure. Connelly further teaches the use of radial filtrate ducts to reduce resistance to filtrate radial flow within a large diameter monolith to a central longitudinal filtrate duct. Such radial filtrate ducts pass through the porous monolith material and do not intersect any of the longitudinal passageways. This arrangement of radial filtrate ducts is such that it is physically difficult to utilize monoliths of high packing density, and the devices of Connelly have packing densities of below about 100 square feet of feed passageway area per cubic foot of monolith structure.

The present applicant in the parent application, U.S. Ser. No. 033,572, discloses several embodiments of monolith cross-flow filters with filtrate networks which effectively eliminate troublesome resistance to filtrate flow in the passageway walls of monoliths. These embodiments are all characterized by transport of filtrate to and removal along at least one side of the monolith structure.

SUMMARY OF INVENTION

It is therefore an object of this invention to provide an improved monolithic cross-flow filtrationndevice which readily removes filtrate from one or both ends of the device.

It is a further object of this invention to provide such a monolithic cross-flow filtration device which has a large amount of surface area of its passageways relative to the volume of the device.

It is a further object of this invention to provide such a monolithic cross-flow filtration device which effectively utilizes substantially all of its passageways by providing a low pressure drop flow path for filtrate between even the innermost passageways and a filtrate collection zone associated with the device.

It is a further object of this invention to provide such a monolithic cross-flow filtration device which enables the walls of the passageways to have smaller pore sizes while still providing adequate filtrate removal rates.

A still further object of this invention is to provide such a monolithic cross-flow filtration device which can have a balanced pressure between its passageways and its exterior surface.

A still further object of this invention is to provide a method of making such a monolithic cross-flow filtration device.

Yet another object of this invention is to provide an improved monolithic membrane support for use in a monolithic membrane device in which membranes are supported on the surfaces of its passageways.

This invention results from the realization that truly effective filtrate removal for a cross-flow filtration device or a membrane device using a porous monolith having multiple passageways can be achieved by constructing a filtrate network having a number of filtrate chambers distributed among the monolith passageways to ensure a favorable pressure drop from any passageway wall to a nearby chamber, the network further including one or more filtrate channels which connect the chambers to one or more filtrate ducts to carry the filtrate through one or both end faces of the structure toward a filtrate collection zone. A still further realization is that a conventional monolith with substantially uniformly spaced passageways can be readily converted into such a structure by selectively sealing existing passageways to form the filtrate chambers and establishing channels from those sealed passageways to direct flow to a filtrate duct which discharges filtrate from an end face of the monolith to a filtrate collection zone.

This invention features a cross-flow filtration device which receives a feed stock at a feed end face and separates the feed stock into filtrate and retentate. The device includes a monolith of porous material which defines a plurality of passageways extending longitudinally from the feed end face to a retentate end face of the monolith through which the feed stock flows to pass retentate from the device. The surface area of the passageways is preferably at least 100 sq. feet per cubic foot of monolith. The device further includes at least one filtrate network having a plurality of longitudinal filtrate chambers, at least one filtrate channel, and at least one filtrate duct. The filtrate channel transects the filtrate chambers and communicates with the filtrate duct to discharge filtrate from at least one end face of the monolith. The filtrate chambers are distributed among the passageways to provide low pressure drop flow paths for filtrate flow through the porous material from the passageways to nearby filtrate chambers.

In one embodiment, the filtrate channel is a slot formed in one end face of the monolith and is sealed at that end face and at the exterior surface of the monolith to isolate the slot from the feed stock and the retentate. Alternatively, the filtrate channel is a hole formed in the monolith which is sealed at the exterior surface of the monolith. The filtrate chambers are formed from one or more rows of passageways which extend across the monolith and may be parallel to each other. The filtrate duct can be a single filtrate duct disposed at one end of the monolith; alternatively, a filtrate duct is disposed at each end face of the monolith. The monolith may be a ceramic material selected from cordierite, alumina, mullite, silica, zirconia, titania, spinel, silicon carbide, or mixtures thereof. The porous material may have a porosity of about 20–60% and a mean pore size of about 0.1 to 50 microns. Permselective membranes, selected from the group of membranes suitable for cross flow microfiltration, ultrafiltration, reverse osmosis, gas separations, or pervaporation, may be applied to the surfaces of the passageways.

This invention also features a method of fabricating a filtrate network in a monolith of porous material having a plurality of passageways extending from an upstream end face to a downstream end face. The method includes selecting a number of passageways as filtrate chamber passageways to distribute the chamber passageways among the non-selected passageways to provide low pressure flow paths from the non-selected passageways through the porous material to nearby filtrate chamber passageways. The method further includes establishing at least one filtrate channel which transects the filtrate chamber passageways, and forming at least one longitudinal filtrate duct to discharge filtrate from at least one end face of the monolith. The filtrate duct communicates with the filtrate channel. The method also includes sealing the filtrate chamber passageways at the end faces of the monolith to inhibit direct passage of fluid into the filtrate chamber passageways.

In one embodiment, selecting includes designating at least one row of passageways which extend across the monolith as the filtrate chamber passageways. Establishing the filtrate channel includes cutting a slot in at least one end face of the monolith to form that filtrate channel, and sealing the slot at the end face and at the exterior surface of the monolith to inhibit direct passage of fluid into the filtrate channel. In another embodiment, establishing the filtrate channel includes forming a hole through the monolith to establish that filtrate channel, and sealing the hole at the exterior surface of the monolith to inhibit direct passage of fluid into the filtrate channel. A filtrate duct may be established at each end face of the monolith, and the method may further include sealing an impervious filtrate extraction coupling tube with the filtrate duct to withdraw filtrate to a filtrate collection zone.

DISCLOSURE OF PREFERRED EMBODIMENT

Other objects, features and advantages will occur from the following description of a preferred embodiment and the accompanying drawings, in which.

This invention may be accomplished by a cross-flow filtration device formed of a multiple-passageway monolith of porous material having one or more filtrate networks distributed among and isolated from the monolith passageways. The resulting cross-flow filtration device receives a feed stock at a feed end face and the walls of the passageways conduct the filtrate to the filtrate networks while passing the impermeable materials as retentate from a retentate end face. The filtrate networks provide paths of lower flow resistance than that of alternative flow paths through the porous material and provide a direct route for the filtrate to travel from the interior of the cross-flow filtration device to a filtrate collection zone through one or more impervious tubes connected to one or both end faces of the cross-flow filtration device.

A device according to this invention is described as a cross-flow filtration device from which filtrate and retentate are extracted, but it is to be recognized that the invention also relates to a porous monolith used as a support for a membrane device from which permeate and retentate are extracted. Hereinafter, the term cross-flow filtration device encompasses a porous monolith support for a membrane device and the term filtrate encompasses permeate extracted from a membrane device. Such membranes can include separation barriers suitable for cross-flow microfiltration, ultrafiltration, reverse osmosis, gas separations, and pervaporation.

Figure 1:
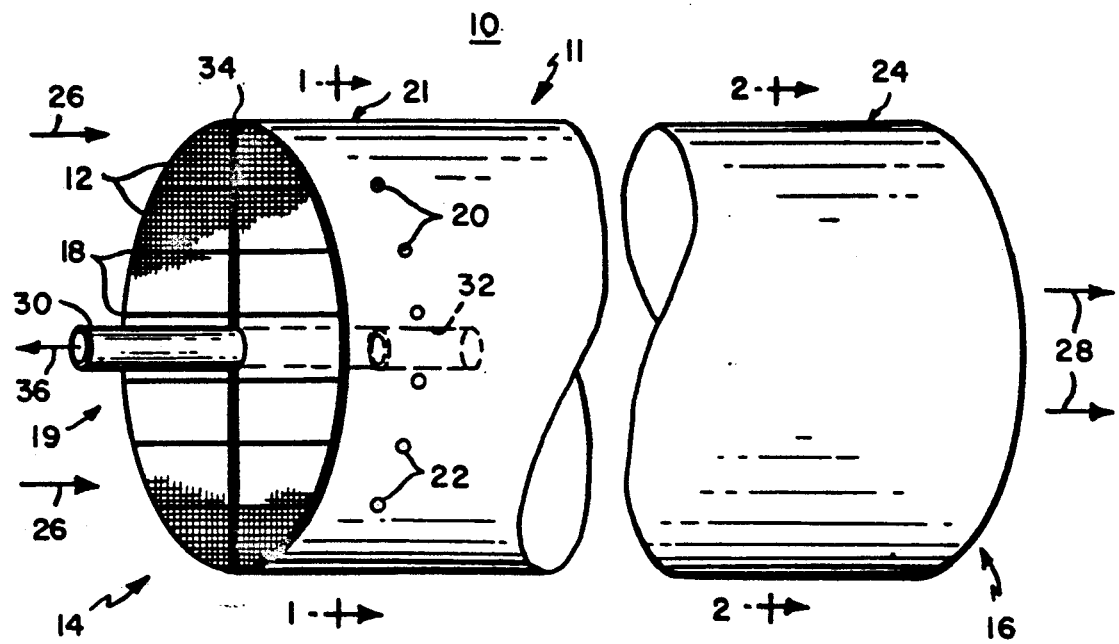
FIG. 1 is a schematic axonometric view of a cross-flow filtration device according to this invention formed from a conventional monolith.

Cross-flow filtration device 10, FIG. 1, is a cylindrical, multiple passageway monolith with longitudinal passageways which are square in cross-section. Most of passageways 12 are open at each end face, and in use feed stock 26 enters these passageways at feed end face 14, flows through passageways 12, and exits monolith 11 as retentate 28 at retentate end face 16. Rows of passageways 18, 34 extending across monolith 11 are sealed at both end faces. These sealed passageways thereby become longitudinal filtrate chambers 18 which are part of filtrate network 19. Network 19 also includes filtrate channels 20 and a filtrate duct 32. Non-longitudinal filtrate channels 20 transect the filtrate chambers 18. Filtrate channel 21, one of filtrate channels 20, transects chambers 34. These filtrate channels can be formed in a conventional monolith by drilling holes across the monolith through the filtrate chambers. All filtrate channels 20 are sealed by plugs 22 at the exterior surface 24 of monolith 11 to isolate them from the zone external to monolith 11. The exterior surface of monolith 11 can either be used as part of the filtration surface or can itself be sealed with an impervious coating.

The cross-flow filtration device contains at least one longitudinal filtrate duct 32 at one or both of end faces 14, 16. Filtrate duct 32 may be formed in the monolith during fabrication, for example by extrusion, and can be an enlarged passageway which extends from one end face to the opposite end face of the monolith. Filtrate duct 32 is preferably larger than the other passageways to minimize filtrate pressure drop for filtrate removal and also to facilitate insertion of an impervious filtrate discharge tube 30. Alternatively, filtrate duct 32 can be an enlarged passageway formed by drilling from end to end of a conventional monolith, or only for a short distance into the monolith. In the latter case, the passageways opening into filtrate duct 32 become filtrate chambers if they are adjacent to any open passageways 12; passageways opening into filtrate duct 32 which are not adjacent to passageways 12 become unused.

Filtrate discharge tube 30 can be made from the same material as the monolith or a different material. Filtrate discharge tube 30 is used to withdraw filtrate 36 from the monolith to a filtrate collection zone, not shown. The filtrate duct and filtrate discharge tube sealed therein can be incorporated at either or both end faces of the monolith. Filtrate discharge tubes in both end faces are used when it is desired to utilize multiple monoliths in series flow within a single housing structure, and it is necessary to interconnect filtrate discharge tubes to allow filtrate withdrawal from monoliths not positioned next to an end cap of the housing. In this instance, interconnecting couplings join adjacent monolith filtrate discharge tubes to provide for leakfree withdrawal of filtrate to a filtrate collection zone.

At least on filtrate channel 20 intersects with filtrate duct 32. This intersection occurs at a point in the filtrate duct not obstructed by the impervious filtrate discharge tube. In FIG. 1, filtrate channel 21 transects filtrate chambers 34, is on a diameter of monolith 11 and is perpendicular to the plurality of other filtrate channels 20 which it intersects, thereby connecting all filtrate channels 20 to filtrate duct 32.

Sealing material used to seal passageways at the end faces 14 and 16 of monolith 11 to make filtrate chambers 18, to seal filtrate channels 22 at exterior surface 24 of the monolith 11, and to seal filtrate discharge tube 30 into filtrate duct 32 can be of the same or a different material as the monolith itself. Passageways at end faces 14 and 16 can be readily sealed to make filtrate chambers after masking the openings of passageways 12 and applying the sealant material.

Figure 2:
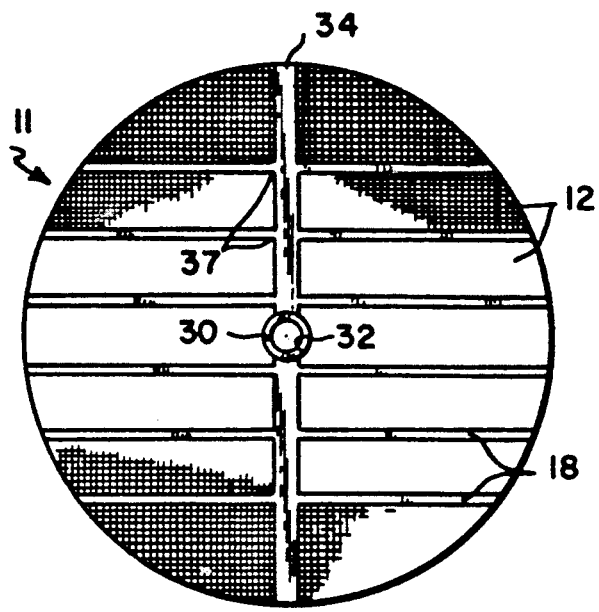
FIG. 2 is an end view of the cross-flow filtration device shown in FIG. 1.

An end view of cross-flow filtration device 10 is shown in FIG. 2. Passageways 12 are unobstructed. Filtrate chambers 18 are sealed and isolated from the passageways. The filtrate discharge tube 30 is sealed into filtrate duct 32. At least one row 34 of filtrate chambers 18 is aligned with filtrate duct 32 and accordingly filtrate discharge tube 30. Row 34 in turn intersects all other rows of filtrate chambers 18 at junctions 36.

Figure 3:
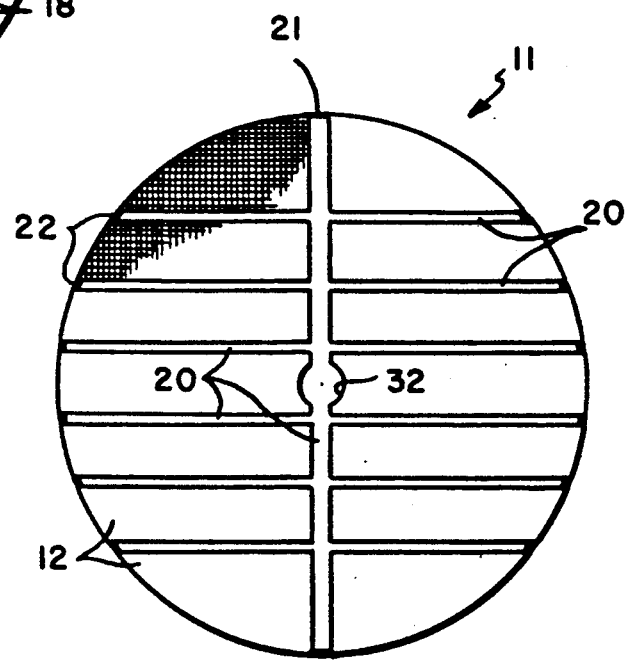
FIG. 3 is a cross-sectional view of the cross-flow filtration device along lines 1—1 of FIG. 1.

A cross-sectional view of cross-flow filtration device 10 along lines 1—1, FIG. 1, passing through the plane of filtrate channels 20 and plugs 22, is shown in FIG. 3. In this plane the filtrate channels 20 are unobstructed by any passageway wall and filtrate can flow unimpeded within the interconnecting filtrate channel network. At least one of the filtrate channels 20, filtrate channel 21 in this construction, intersects filtrate duct 32. This construction allows complete communication of all filtrate channels 20 with filtrate duct 32. Not shown in FIG. 3 are the open ends of filtrate chambers 18 which open into the filtrate channels.

Figure 4:
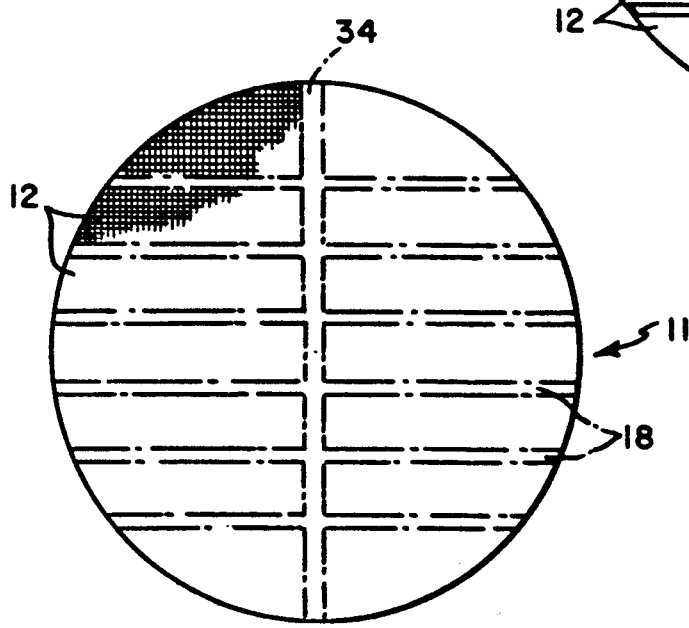
FIG. 4 is a cross-sectional view of the cross-flow filtration device along lines 2—2 of FIG. 1.

A cross-sectional view of cross-flow filtration device 10 along line 2—2, not in the plane of the filtrate channels, is shown in FIG. 4. In this cross-sectional view, all passageways 12 and filtrate chambers 18 are open and are indistinguishable one from another. Filtrate chambers 18, 34 are shown in phantom solely for purposes of illustration to indicate their location in this view.

In operation, referring to FIG. 1, filtrate from one of passageways 12 flows through passageway walls until it arrives at one of longitudinal filtrate chambers 18. Because the filtrate chambers extend essentially the entire length of the cross-flow filtration device, a short path length for filtrate flow through passageway walls to a filtrate chamber is assured for filtrate from all passageways. Upon attaining a filtrate chamber the filtrate flows longitudinally toward a filtrate channel. The filtrate channel transects only filtrate chambers, not feed passageways, and the filtrate channel carries the filtrate flow primarily in a non-longitudinal direction. The cross-flow filtration device of FIG. 1 contains a plurality of rows of filtrate chambers, each row transected by a filtrate channel. The filtrate channels in turn communicate with a filtrate duct.

This combination of rows of filtrate chambers, each row transected by a filtrate channel, and each filtrate channel communicating with at least one filtrate duct allows a short flow path length for filtrate flow from each passageway through the passageway walls to the external filtrate collection zone. The filtrate flow path is comprised of a plurality of longitudinal filtrate chambers, transected by at least one substantially non-longitudinal filtrate channel, which communicates with at least one longitudinal filtrate duct. This combination comprises a filtrate network according to this invention.

Figure 5:
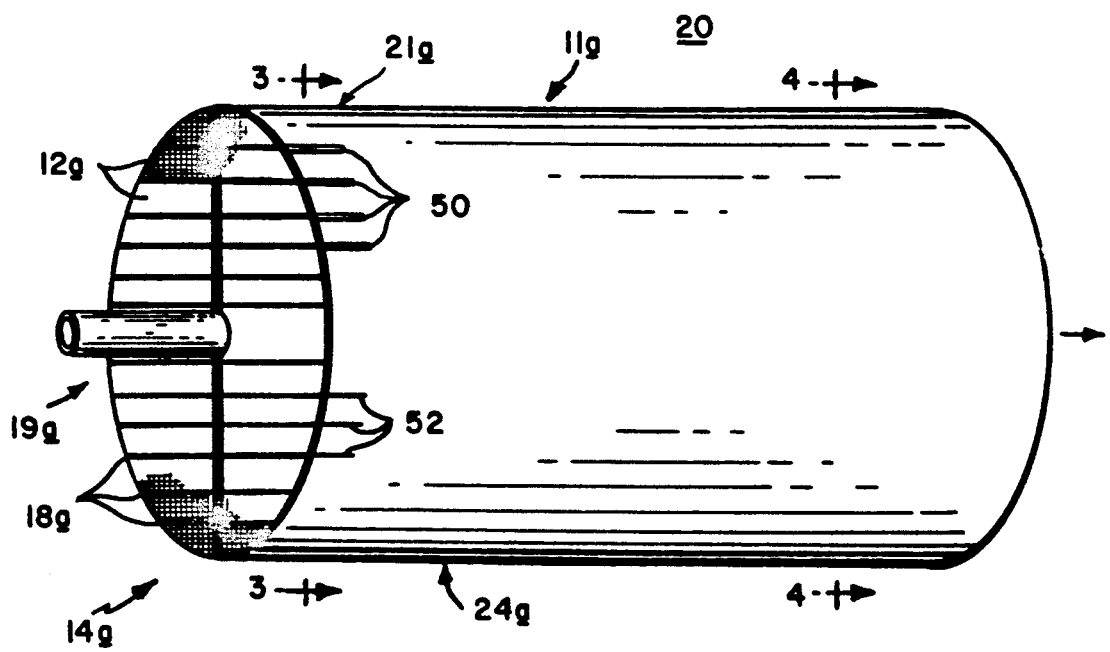
FIG. 5 is a schematic axonometric view of yet another cross-flow filtration device according to this invention formed from a conventional monolith.

Device 20, FIG. 5, is another embodiment of a cross-flow filtration device according to this invention with an alternative configuration of the filtrate channels. Network 19a is established by filtrate chambers 18a, channels 20a and duct 32a formed among passageways 12a. In this embodiment filtrate channels are made by forming slots 50 in at least one end face of the monolith. These slots are sealed with plugs 52 at end face 14a and at skin 24a of monolith 11a. Passageways opening into the slots 50 are sealed at the opposite end face of monolith 16 to form filtrate chambers. At least one filtrate channel 21a communicates with filtrate duct 32a. A cross-sectional view of monolith 11a at end face 14 corresponds to the view shown in FIG. 2; a cross-sectional view along line 3—3 corresponds to the view shown in FIG. 3; and a cross-sectonal view along line 4—4 corresponds to the view shown in FIG. 4. Slots 50 in the end of the monolith can be formed, for example, by sawing or machining. Slots can be formed and filtrate channels created in one or both ends of the monolith.

Cross-flow filtration device 10 or 20 can be fabricated from a variety of porous materials, such as ceramics, plastics, or resin-impregnated solids such as sand. Among ceramics, it is desirable to use cordierite, alumina, mullite, silica, zirconia, titania, silicon carbide, spinel, or mixtures thereof. Acceptable porosities of the material range from 20 to 60 percent, preferably greater than 30 percent. The mean pore size, while selectable over a wide range, is typically in the range of about 0.1 to 50 microns, and preferably in the range of about 2 to 25 microns.

While a square array of square passageways is used for the above examples, it is to be recognized that other passageway shapes, such as round or triangular, and other arrays, such as hexagonally spaced, may be employed. Further, in the above examples essentially parallel filtrate channels are described, but it is to be recognized that alternative filtrate channel configurations, such as ones aligned on the radii of a cylindrical monolith, may be employed. Moreover, a number of independent filtrate networks can be established in a monolith.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. A cross-flow filtration device for receiving a feed stock at a feed end face and for separating the feed stock into filtrate and retentate, comprising:

a monolith of porous material defining a plurality of passageways extending longitudinally from the feed end face to a retentate end face of the monolith through which the feed stock flows to pass retentate from the device, the surface area of the passageways being at least 100 square feet per cubic foot of monolith;

at least one filtrate network including a plurality of longitudinal filtrate chambers, at least one filtrate channel, and at least one filtrate duct, the filtrate channel transecting the filtrate chambers and communicating with the filtrate duct to discharge filtrate from the filtrate chambers through the filtrate duct from at least one end face of the monolith; and the filtrate chambers being isolated from both end faces of the monolith and being distributed among the passageways to provide low pressure drop flow paths for filtrate flow through the porous material from the passageways to nearby filtrate chambers.

2. The cross-flow filtration device of claim 1 in which the filtrate channel is a slot formed in one end face of the monolith and is sealed at that end face and at the exterior surface of the monolith to isolate the slot from the feed stock and the retentate.

3. The cross-flow filtration device of claim 1 in which the filtrate channel is a hole formed in the monolith and is sealed at the exterior surface of the monolith.

4. The cross-flow filtration device of claim 1 in which the filtrate chambers are formed from at least one row of passageways which extends across the monolith.

5. The cross-flow filtration device of claim 1 in which the filtrate chambers are formed from a plurality of parallel rows of passageways.

6. The cross-flow filtration device of claim 1 in which the filtrate duct is a single duct which is accessible at one end face of the monolith.

7. The cross-flow filtration device of claim 1 in which said filtrate duct is disposed at the feed end face and a second filtrate duct is disposed at the retentate end face of the monolith.

8. The cross-flow filtration device of claim 1 in which the monolith porous material is a ceramic material.

9. The cross-flow filtration device of claim 8 in which the ceramic material is selected from cordierite, alumina, mullite, silica, zirconia, titania, spinel, silicon carbide, or mixtures thereof.

10. The cross-flow filtration device of claim 1 in which the porous material has a porosity of about 20 to 60 percent.

11. The cross-flow filtration device of claim 1 in which the porous material has a mean pore size of about 0.1 to 50 microns.

12. The cross-flow filtration device of claim 1 further including a permselective membrane applied to the surfaces of the passageways.

13. The cross-flow filtration device of claim 12 in which the permselective membrane is selected from the group of membranes suitable for cross-flow microfiltration, ultrafiltration, reverse osmosis, gas separations, or pervaporation.

14. A method of fabricating a filtrate network in a monolith of porous material having a plurality of passageways extending from an upstream end face to a downstream end face of the monolith, comprising:
   selecting a plurality of passageways as filtrate chamber passageways to distribute the filtrate chamber passageways among the non-selected passageways to provide low pressure drop flow paths from the non-selected passageways through the porous material to nearby filtrate chamber passageways, the surface area of the non-selected passageways being at least 100 square feet per cubic foot of the monolith;
   establishing at least one filtrate channel which transects the filtrate chamber passageways;
   forming at least one longitudinal filtrate duct to discharge filtrate from at least one end face of the monolith, the filtrate duct communicating with the filtrate channel; and
   sealing the filtrate chamber passageways at the end faces of the monolith to inhibit direct passage of fluid into the filtrate chamber passageways.

15. The method of claim 14 in which selecting includes designating at least one row of passageways which extend across the monolith as the filtrate chamber passageways.

16. The method of claim 14 in which establishing the filtrate channel includes cutting a slot in at least one end face of the monolith to form that filtrate channel, and sealing the slot at the end face and exterior surface of the monolith to inhibit direct passage of fluid into the filtrate channel.

17. The method of claim 14 in which establishing the filtrate channel includes forming a hole through the monolith to establish that filtrate channel, and sealing the hole at the exterior surface of the monolith to inhibit direct passage of fluid into the filtrate channel.

18. The method of claim 14 in which a filtrate duct is established at each end face of the monolith.

19. The method of claim 14 in further including sealing an impervious filtrate extraction coupling tube with the filtrate duct to withdraw filtrate to a filtrate collection zone.

20. A cross-flow filtration device for receiving a feed stock at a feed end face and for separating the feed stock into filtrate and retentate, comprising;
   a monolith of porous material defining a plurality of passageways extending longitudinally from the feed end face to a retentate end face of the monolith through which the feed stock flows to pass retentate from the device;
   at least one filtrate network including a plurality of longitudinal filtrate chambers, at least one filtrate channel, and at least one filtrate duct, the filtrate channel transecting the filtrate chambers and communicating with the filtrate duct to discharge filtrate from the filtrate chambers through the filtrate duct from at least one end face of the monolith; and
   the filtrate chambers being isolated from both end faces of the monolith and being distributed among the passageways to provide low pressure drop flow paths for filtrate flow through the porous material from the passageways to nearby filtrate chambers.

21. The cross-flow filtration device of claim 20 further including a permselective membrane applied to the surfaces of the passageways.

22. The cross-flow filtration device of claim 21 in which the permselective membrane is selected from the group of membranes suitable for cross-flow microfiltration, ultrafiltration, reverse osmosis, gas separations, or pervaporation.

23. The cross-flow filtration device of claim 21 wherein each filtrate chamber is defined by the porous material and receives filtrate along substantially its entire length through the porous material.

24. The cross-flow filtration device of claim 23 wherein the porous material further defines the filtrate channel and the filtrate duct.

* * * * *